US008762720B2

(12) United States Patent
Charrat et al.

(10) Patent No.: US 8,762,720 B2
(45) Date of Patent: Jun. 24, 2014

(54) METHOD OF MUTUAL AUTHENTICATION BETWEEN A COMMUNICATION INTERFACE AND A HOST PROCESSOR OF AN NFC CHIPSET

(75) Inventors: Bruno Charrat, Aix en Provence (FR); Philippe Martineau, Fuveau (FR)

(73) Assignee: Inside Secure, Aix-en-Provence (FR)

( * ) Notice: Subject to any disclaimer, the term of this patent is extended or adjusted under 35 U.S.C. 154(b) by 1646 days.

(21) Appl. No.: 11/867,123

(22) Filed: Oct. 4, 2007

(65) Prior Publication Data

US 2008/0085001 A1    Apr. 10, 2008

(30) Foreign Application Priority Data

Oct. 5, 2006  (FR) ...................................... 06 08764

(51) Int. Cl.
*H04L 9/32*    (2006.01)
(52) U.S. Cl.
USPC ....... 713/169; 379/55.1; 340/854.8; 455/41.1
(58) Field of Classification Search
USPC ....... 713/169; 379/55.1; 340/854.8; 455/41.1
See application file for complete search history.

(56) References Cited

U.S. PATENT DOCUMENTS

| | | | | |
|---|---|---|---|---|
| 6,484,935 | B1 * | 11/2002 | Fischbacher | 235/376 |
| 6,510,517 | B1 * | 1/2003 | Bruhnke et al. | 713/168 |
| 6,554,193 | B1 * | 4/2003 | Fehrman et al. | 235/488 |
| 6,899,276 | B2 * | 5/2005 | Limelette et al. | 235/492 |
| 7,024,226 | B2 * | 4/2006 | Sandberg et al. | 455/558 |
| 7,590,409 | B2 * | 9/2009 | Morita | 455/411 |
| 7,606,560 | B2 * | 10/2009 | Labrou et al. | 455/411 |
| 7,818,572 | B2 * | 10/2010 | Stewart et al. | 713/169 |
| 2004/0066278 | A1 | 4/2004 | Hughes et al. | |
| 2005/0231921 | A1 * | 10/2005 | Noda et al. | 361/737 |
| 2006/0208066 | A1 * | 9/2006 | Finn et al. | 235/380 |
| 2006/0251256 | A1 * | 11/2006 | Asokan et al. | 380/270 |
| 2006/0287004 | A1 * | 12/2006 | Fuqua | 455/558 |
| 2007/0011728 | A1 * | 1/2007 | White | 726/9 |

(Continued)

FOREIGN PATENT DOCUMENTS

| | | | | |
|---|---|---|---|---|
| DE | 19826428 | A1 * | 12/1999 | ........... G06K 19/077 |
| DE | 19922063 | A1 * | 11/2000 | ............. G06K 7/015 |

(Continued)

OTHER PUBLICATIONS

Menezes et al. "Handbook of Applied Cryptography" © 1997 CRC Press LLC. Excerpt from Chapter 10 (pp. 385-424).*

(Continued)

*Primary Examiner* — Beemnet Dada
*Assistant Examiner* — Thomas Gyorfi
(74) *Attorney, Agent, or Firm* — Panitch Schwarze Belisario & Nadel LLP

(57) ABSTRACT

An authentication method between a secure host processor and a controller of an NFC system, the controller being equipped with an NFC interface circuit sending and receiving contactless data, includes connecting the host processor to the controller and checking that there is a predefined relation between a first secret data stored by the host processor and a second secret data stored by the controller. The method further includes transmitting the second secret data to the controller and storing of the second secret data by the controller. The host processor may be removably associated with a contactless component storing the second secret data which is contactlessly transmitted to the controller.

26 Claims, 5 Drawing Sheets

(56) References Cited

U.S. PATENT DOCUMENTS

2007/0055633 A1* 3/2007 Cheon et al. .............. 705/65
2007/0194945 A1* 8/2007 Atkinson ............. 340/825.72
2008/0024268 A1* 1/2008 Wong et al. ............... 340/5.8
2008/0104394 A1* 5/2008 Want et al. ................. 713/168

FOREIGN PATENT DOCUMENTS

| DE | 19926348 A1 * | 12/2000 | ........... G06K 19/077 |
|----|---------------|---------|-------------------------|
| WO | 02/45441 A1 | 6/2002 | |
| WO | 2004/036513 A1 | 4/2004 | |
| WO | WO 2006/027723 A1 * | 3/2006 | |
| WO | 2006/100171 A1 | 9/2006 | |

OTHER PUBLICATIONS

Juan Carlos Lopez Calvet, "The role of RFID in the mobile phone", Telektronikk, No. 3, pp. 131-142, (2005).

* cited by examiner

METHOD OF MUTUAL AUTHENTICATION BETWEEN A COMMUNICATION INTERFACE AND A HOST PROCESSOR OF AN NFC CHIPSET

BACKGROUND OF THE INVENTION

Embodiments of the present invention relate to an authentication method in a Near Field Communication (NFC) system or chipset comprising an NFC interface circuit sending and receiving contactless data.

Embodiments of the present invention particularly relate to authenticating a secure processor of the chipset by an NFC component of the chipset. "NFC component" means a controller (microcontroller) connected to an NFC interface circuit.

NFC technology is currently developed by an industrial consortium grouped under the name Forum NFC (http://www.nfc-forum.org). The NFC technology is derived from Radio Frequency Identification (RFID) technology and uses NFC components which may have several operating modes, i.e., a "reader" mode, a "card emulation" mode, and a "device" mode (also referred to as "device-to-device" mode). In the "reader" mode, the NFC component operates like a standard RFID reader to read- or write-access an RFID chip (e.g., chip card or contactless tag). The NFC component emits a magnetic field, sends data by modulating the amplitude of the magnetic field, and receives data by load modulation and inductive coupling. In the "emulation" mode, described in commonly assigned patent EP 1 327 222, the NFC component operates passively like a transponder to communicate with another reader and to be seen by the other reader as an RFID chip. The component does not emit any magnetic field, receives data by demodulating a magnetic field emitted by the other reader, and sends data by modulating the impedance of its antenna circuit (load modulation). In the "device" mode, the component must match another NFC component located in the same operating mode, and each NFC component alternately goes into a passive state (without field emission) to receive data and into an active state (with field emission) to send data.

In addition to these three operating modes (other operating modes could be designed in the future), an NFC component may implement several contactless communication protocols and is capable, for example, of exchanging data according to the ISO 14443-A protocol, the ISO 14443-B protocol, the ISO 15693 protocol, or the like. Each protocol defines a frequency of emission of the magnetic field, a modulation method for modulating the amplitude of the magnetic field to send data in active mode, and a load modulation method by inductive coupling to send data in passive mode. Therefore, an NFC component is a multimode and multi-protocol device. The applicant markets, for example, an NFC component under the name "MicroRead".

BRIEF SUMMARY OF THE INVENTION

Due to its extended communication capacities, an NFC component is intended to be integrated into portable devices such as cellular telephones or Personal Digital Assistants (PDAs). As a result, an NFC chipset of the type represented in FIG. 1 is produced, i.e., a chipset comprising an NFC component (referenced "NFCR1") and at least one first host processor HP1. "Host processor" may be defined as any integrated circuit comprising a microprocessor or a microcontroller and which is connected to a port of the NFC component. In many applications, the NFC chipset also comprises a second host processor HP2, and occasionally a third or more.

The first host processor HP1 may be the main processor of the device in which the NFC component NFCR1 is embedded, while the second host processor HP2 may be a secure circuit. The host processor HP1 is generally a non-secure processor, for example, the baseband circuit (or radiotelephone circuit) of a mobile telephone. The host processor HP2 is, for example, a SIM card (i.e., the microcontroller present in a SIM card). Therefore, the resources of the NFC component are made available to the processors HP1, HP2 to enable them to manage contactless applications. Such applications are shown in FIG. 2, which represents a mobile telephone 30 equipped with the NFC chipset in FIG. 1. The following may be distinguished:

1) Applications of AP1 type: The NFC component NFCR1 of the mobile telephone 30 is in "reader" mode to read or write to a contactless integrated circuit CLCT. The mobile telephone 30 is, in this case, used like an RFID reader. This type of application AP1 can be free of charge and include, for example, reading advertising data inserted into an advertisement at a bus shelter. The application AP1 can also be chargeable and include, for example, reading information reserved for subscribers. The program of the application AP1 is preferably held and executed by the processor HP1 if the service is free of charge, or is preferably held and executed by the processor HP2 if it is chargeable, as it requires an identification of the subscriber. Thus, as shown in FIG. 1, an application AP1 can be processed by the processor HP1 or the processor HP2.

2) Applications of AP2 type: The NFC component NFCR1 of the telephone 30 is in "card emulation" mode to be read by standard RD readers in payment or chargeable access control applications (e.g., payment machine, entrance to the subway, or the like). The mobile telephone 30 is then used like a chip card. The program of the application AP2 is preferably held and executed by the secure processor HP2, as represented in FIG. 1, as access to the service requires an identification of the subscriber.

3) Applications of AP3 type: The NFC component NFCR1 of the telephone 30 is in "device" mode and communicates with another device, for example, a reader integrated into another mobile telephone 31 or a computer 32. This type of application AP3 is generally free of charge and enables data packets to be transferred from one device to another (particularly point-to-point file transfer). The program of the application AP3 is preferably held and executed by the non-secure processor HP1, as shown in FIG. 1, which has a computing power greater than the secure processor HP2, if the latter is a SIM card processor.

FIG. 3 schematically represents the architecture of the NFC component NFCR1. The component NFCR1 comprises an interface circuit CLINT to send/receive contactless data, equipped with an antenna circuit ACT, hard-wire communication interfaces INT1, INT2 connected to the interface circuit CLINT, and a controller NFCC. The interface INT1 is connected to the host processor HP1, and the interface INT2 is connected to the host processor HP2. All of these components form an NFC chipset.

Thus, the production of an NFC chipset requires establishing communication channels between each of the host processors HP1, HP2 and the NFC component NFCR1 to enable the host processors HP1, HP2 to send data via the contactless data transmission channel and to route the incoming data streams (data received via the contactless data transmission channel) towards each of the host processors HP1, HP2.

However, in certain applications of the AP2 type presented above, for example, one of the host processors HP1, HP2 is secure. It is therefore preferable for the communication channel between the secure host processor and the NFC component NFCR1 to be secure itself, particularly to avoid the possibility of secret data transmitted via a contactless transmission channel being intercepted or modified, or even emulated by a non-authorized device.

The establishment of such a secure transmission channel generally requires an authentication of the host processor by the NFC component NFC1, and therefore the sharing of common secret data or the respective knowledge of complementary secret data.

Generally, the manufacturer of an NFC chipset is not the same as the manufacturer of secure host processors nor the operator who customizes each secure host processor. In addition, an NFC chipset may need to be connected to different interchangeable secure processors. Therefore, the NFC controller cannot be customized to store secret data of a specific secure host processor.

In one embodiment, the NFC component NFCR1 of an NFC chipset may authenticate a secure processor so as to be capable of establishing a secure transmission channel between the NFC component NFCR1 and the secure processor.

This may be achieved by providing an authentication method between a secure host processor and a controller of an NFC system. The controller is connected to an NFC interface circuit sending and receiving contactless data. The method includes connecting the host processor to the controller and checking that there is a predefined relation between a first secret data stored by the host processor and a second secret data stored by the controller.

According to one embodiment, the method further includes transmitting the second secret data to the controller, and of the controller storing the second secret data.

According to another embodiment, the controller authenticates the host processor by checking the relation between the first and second secret data.

According to a further embodiment, the host processor authenticates the controller by checking the relation between the first and second secret data.

According to still another embodiment, the method further includes the controller transmitting a session key to the host processor if the authentication of the host processor by the controller was successful. The session key is then used to cipher the data exchanged between the host processor and the controller.

According to one embodiment, the method includes the host processor sending an authentication request to the controller. The controller answers the request by supplying a random number. The host processor ciphers the random number received by means of an encryption function using the first secret data it stores as an enciphering key, and transmits the result of the enciphering to the controller. The controller checks the result of the enciphering received by way of an encryption function using the second secret data it stores as an enciphering key, The authentication of the host processor is successful if the check was successfully performed.

According to another embodiment, the first and second secret data are identical.

According to another embodiment, the first secret data is a public enciphering key and the second secret data is a private enciphering key linked to the first secret data by an asymmetric encryption relation.

According to a still further embodiment, the method also includes supplying the host processor, the host processor being removably associated with a contactless component storing the second secret data to be transmitted to the controller, and connecting the host processor to the controller. The second secret data is transmitted to the controller by the contactless component.

According to another embodiment, the host processor is an integrated circuit of a SIM card removable from a card integrating a contactless component storing the second secret data to be contactlessly transmitted to the controller. The NFC system is a mobile telephone including another host processor connected to the controller.

According to another embodiment, the second secret data is transmitted to the controller by optically reading an optical code which is translated and transmitted to the controller.

According to one embodiment, the second secret data is transmitted to the controller by keyboarding the value of the second secret data that is transmitted to the controller.

The present disclosure also relates to a system including a controller connected to an interface circuit for sending/receiving contactless data of NFC type, and a connector for connecting the controller to a host processor. The controller is configured to check that there is a predefined relation between a first secret data stored by the host processor and a second secret data stored by the controller.

According to one embodiment, the controller is configured to receive and store the second secret datum when the system is initialized.

According to another embodiment, the controller is configured to authenticate the host processor by checking the relation between the first and second secret data.

According to a further embodiment, the host processor is configured to authenticate the controller by checking the relation between the first and second secret data.

According to another embodiment, the controller is configured to transmit a session key to the host processor if the authentication of the host processor by the controller was successful. The session key is used to cipher the data exchanged between the host processor and the controller.

According to another embodiment, the host processor is configured to send an authentication request to the controller. The controller is configured to answer the request by supplying a random number. The host processor is configured to cipher the random number received using an encryption function using the first secret data as an enciphering key, and to transmit the result of the enciphering to the controller. The controller is configured to check the result of the enciphering received using an encryption function using the second secret data as an enciphering key. The authentication of the host processor is successful if the check was successfully performed.

According to another embodiment, the host processor is removably associated with a contactless component storing the second secret data to be contactlessly transmitted to the controller.

According to another embodiment, the host processor is an integrated circuit of a SIM card removable from a smart card integrating a contactless component storing the second secret data to be contactlessly transmitted to the controller, and the NFC system is a mobile telephone comprising another host processor connected to the controller.

According to a still further embodiment, the second secret data is transmitted to the controller by optically reading an optical code which is translated and transmitted to the controller.

According to another embodiment, the second secret data is transmitted to the controller by keyboarding the value of the second secret data, which is transmitted to the controller.

The present disclosure also relates to a smart card including an integrated circuit card removable from the smart card and integrating a secure processor saving a first secret data. The smart card also includes a contactless component coupled to an NFC interface circuit sending and receiving contactless data, and saving a second secret data to be contactlessly transmitted. The second secret data is linked to the first secret data by a predefined relation.

According to one embodiment, the secure processor is configured to authenticate a controller by checking the relation between the first and second secret data.

According to another embodiment, the secure processor is configured to receive a session key if it has been authenticated by a controller. The session key is used to cipher the data exchanged between the host processor and the controller.

According to one embodiment, the secure processor is configured to send an authentication request to the controller, receive a random number, cipher the random number received using an encryption function using the first secret data as an enciphering key, and transmit the result of the enciphering.

BRIEF DESCRIPTION OF THE SEVERAL
VIEWS OF THE DRAWINGS

The foregoing summary, as well as the following detailed description of the invention, will be better understood when read in conjunction with the appended drawings. For the purpose of illustration, there are shown in the drawings embodiments which are presently preferred. It should be understood, however, that the invention is not limited to the precise arrangements and instrumentalities shown.

DETAILED DESCRIPTION OF THE INVENTION

Figure 4A:
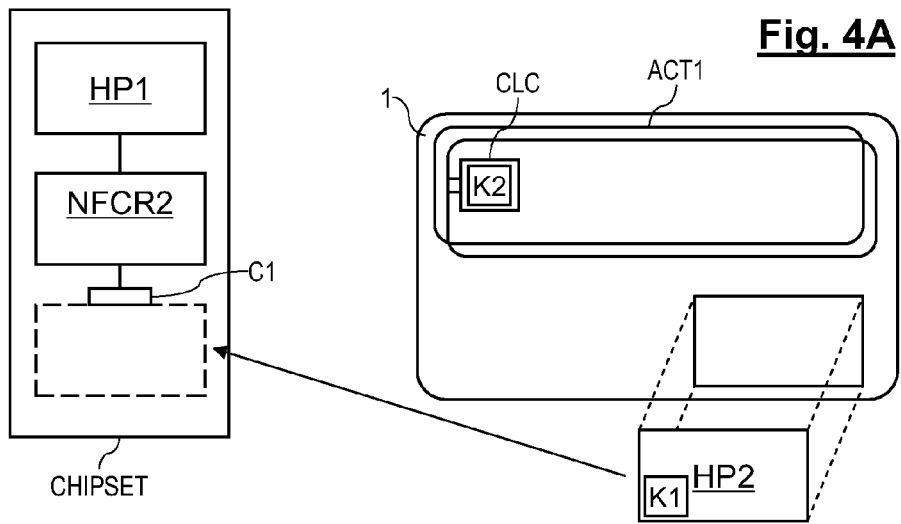
FIG. 4A to 4C show an NFC chipset capable of receiving an interchangeable secure host processor removed from a card equipped with an NFC component, according to a preferred embodiment.
Figure 4B:
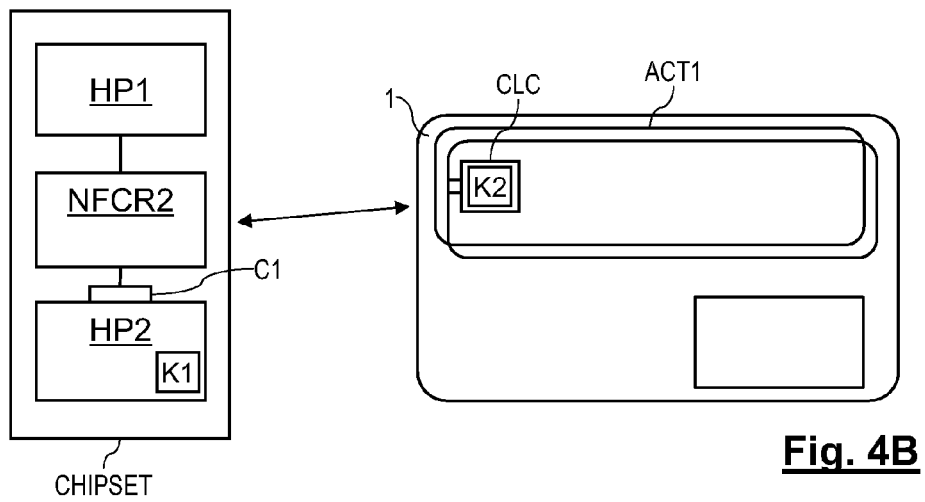
Figure 4C:
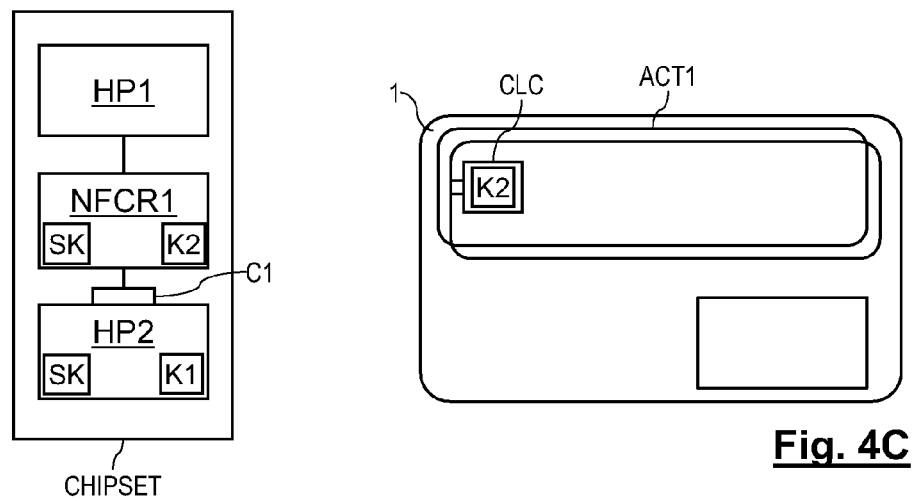

FIGS. 4A to 4C schematically show the implementation of an authentication method according to a preferred embodiment. The method is implemented in an NFC chipset comprising an NFC component referenced "NFCR2", a first host processor HP1, and connecting means C1 for connecting the component NFCR2 to a second host processor HP2. The component NFCR2 is substantially similar to the component NFCR1 described above, particularly with respect to a controller NFCC and an interface circuit CLINT, for sending/receiving contactless data, equipped with an antenna circuit ACT.

The connecting means C1 may be, for example, contact pads provided to co-operate with contact pads formed on the host processor HP2. Alternatively, the host processor HP2 is coupled to a contactless communication interface circuit to communicate with the controller NFCC.

In FIG. 4A, the NFC chipset does not yet include a second host processor HP2, which is removably integrated into a smart card 1.

According to one preferred embodiment, the smart card 1 into which the host processor HP2 is integrated comprises a contactless component CLC with units similar to those of the component NFCR1 described above. Thus, the component CLC particularly includes a controller NFCC and an interface circuit CLINT, for sending/receiving contactless data, equipped with an antenna circuit ACT1, but no hard-wire communication interfaces INT1, INT2. The processor HP2 is removable from the smart card 1 for insertion into the chipset, where it is connected to the component NFCR2 by the connecting means C1.

The processor HP2 and the component CLC have previously been customized and thus each store a secret data K1, K2. The secret data K1, K2 stored respectively by the processor HP2 and the component NFCR2 are linked to each other by a relation that it is possible to check. This relation may simply be an equality relation or any other relation, such as an encryption function. Therefore, the data K1 stored by the host processor may be a private key and the data K2 stored by the component NFCR2 may be a public key of a pair of asymmetric enciphering keys.

The host processor HP1 is, for example, the main processor of the chipset into which the component NFCR2 is embedded. The component NFCR2 and the processor HP2 each may be a secure processor, i.e., comprising the classic encryption and authentication circuits of secure processors. The processor HP1 is not secure. The chipset may also comprise a third host processor HP3.

For example, the chipset may be a mobile telephone. The processor HP1 is the main processor of the telephone, the processor HP2 is a chip of a SIM card, and the processor HP3 is a bank card chip.

The processor HP2 is removed from the card 1 into which the component CLC is integrated, and inserted into the chipset, where it is connected to the component NFCR2 as shown by FIGS. 4A and 4B. In parallel, the component NFCR2 is in "reader" mode when the chipset is initialized, and seeks to read an NFC component in passive mode. When the component CLC is put near the chipset, the component NFCR2 activates the component CLC, which supplies the component NFCR2 with the secret data K2. The data K2 is stored by the component NFCR2 in a non-volatile memory of the EEPROM type, for example (FIG. 4C).

Figure 5:
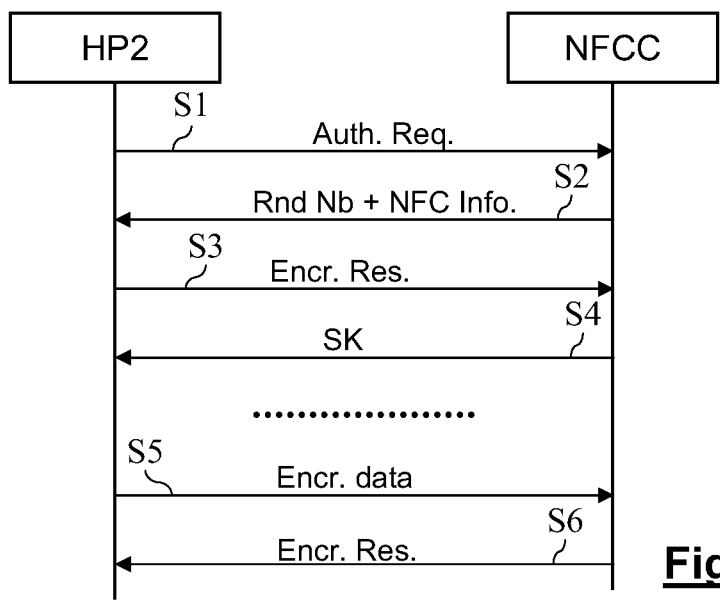
FIG. 5 shows an authentication sequence executed by an NFC component of the NFC chipset and a secure host processor according to a preferred embodiment.

When the host processor HP2 is connected to the component NFCR2 and every time the chipset is initialized, an authentication sequence is triggered. FIG. 5 shows different steps of such an authentication sequence executed by the secure host processor HP2 and the controller NFCC of the component NFCR2.

During a first step S1, the processor HP2 sends an authentication request to the controller NFCC. In the next step S2, the controller NFCC answers the request by supplying a random number "Rnd Nb" and information "NFC Info." relating to the NFC component (for example a serial number, a manufacturing date, a software version number, or the like). In the next step S3, the processor HP2 uses the secret data K1 as an enciphering key to cipher the random number received, and possibly any other information received, and transmits the ciphered data to the controller NFCC.

In the next step S4, the controller NFCC deciphers the data received using the secret data K2 as an enciphering key. If the deciphered data corresponds to the data sent in step S2, the secret data K1, K2 are indeed linked by a predefined relation, and the controller NFCC considers the processor HP2 to be authenticated. If so, the controller NFCC transmits a message to the processor HP2 notifying it that it has been authenticated and containing a session key SK. The session key SK is, for example, a random number.

If the deciphering of the ciphered information does not supply the information it transmitted to the processor HP2, the controller NFCC considers the processor HP2 as not authenticated, and refuses any other communication with the processor HP2.

If the processor HP2 has been authenticated, the controller NFCC and the processor HP2 may exchange information, such as configuration and management information, in a ciphered form using the session key SK as a symmetric enciphering key (steps S5 and S6). For example, a routing table stored in the non-volatile memory of the controller NFCC can thus be transferred into the processor HP2 in order to be used in another NFC chipset (for example, another mobile telephone). Alternatively, the information stored in the non-volatile memory of the controller NFCC can also be transferred into the component CLC in order to be used in another NFC chipset.

The information transmitted in step S2 can also be ciphered by the controller NFCC using the secret data K2, the result of the enciphering being transmitted with the non-ciphered information. The processor HP2 may then decipher the result of the enciphering using the secret data K1 and check the identity between the information received and the result of the deciphering. In this way, the processor HP2 can check whether the controller NFCC has the secret data K2 corresponding to the secret data K1, and thus authenticate the controller NFCC. If the host processor HP2 does not authenticate the controller NFC, it refuses to communicate with the controller NFC.

If the processor HP2 installed in the NFC chipset is replaced with a new host processor, the new host processor will not have the session key SK and will not therefore be able to communicate with the controller NFCC, unless the component CLC corresponding to the new host processor is available and unless the execution of the authentication procedure described above with reference to FIG. 5 is launched, by triggering the initialization of the NFC chipset.

Figure 6:
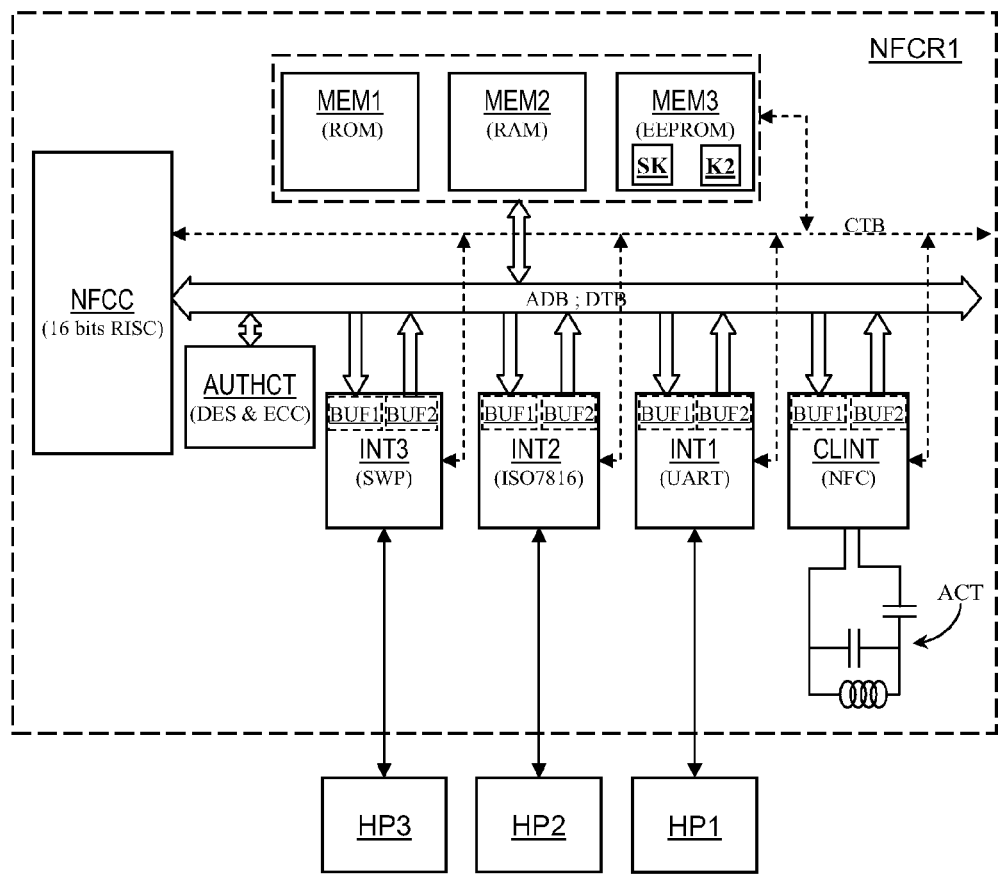
FIG. 6 shows an example of hardware architecture of an NFC component present in the NFC chipset in FIG. 4A to 4C according to a preferred embodiment.

FIG. 6 shows an example of hardware architecture of the component NFCR2 shown in FIGS. 4A to 4C. The component NFCR2 includes the controller NFCC and the interface CLINT already described, and a memory array comprising a ROM-type (read-only memory) program memory MEM1, a RAM-type (random access memory) data memory MEM2, and an EEPROM-type electrically erasable and programmable memory MEM3 enabling the secret data K2 and the session key SK to be recorded. The component NFCR2 also includes an authentication and error correction circuit AUTHCT having Data Encryption Standard (EFS) and Elliptic Curve Cryptography (ECC) algorithms, or other encryption algorithms. A connection port INT1 of UART (Universal Asynchronous Receiving Transmitting) type connects to the host processor HP1. An ISO7816-type connection port INT2 connects to the host processor HP2 (the processor HP2 here being assumed to be a SIM card). An SWP-type (Single Wire Protocol) connection port INT3 enables the host processor HP3 to be connected. A data bus DTB and an address bus ADB link the memory array, the controller NFCC, the interface CLINT and the ports INT1, INT2, INT3. A control bus CTB enables the controller NFCC to read- and/or write-control and access these various elements.

The interface CLINT and the ports INT1, INT2, INT3 each have a parallel-input input buffer BUF1 and a parallel-output output buffer BUF2 that is write-accessible and respectively read-accessible via the data bus and the address bus. The exchange of data forming the routing commands or the data frames between the host processors HP1, HP2, HP3 and the controller NFCC or the interface CLINT is thus performed by data blocks of the size of the buffers BUF1, BUF2, and is paced by the controller NFCC.

Figure 7:
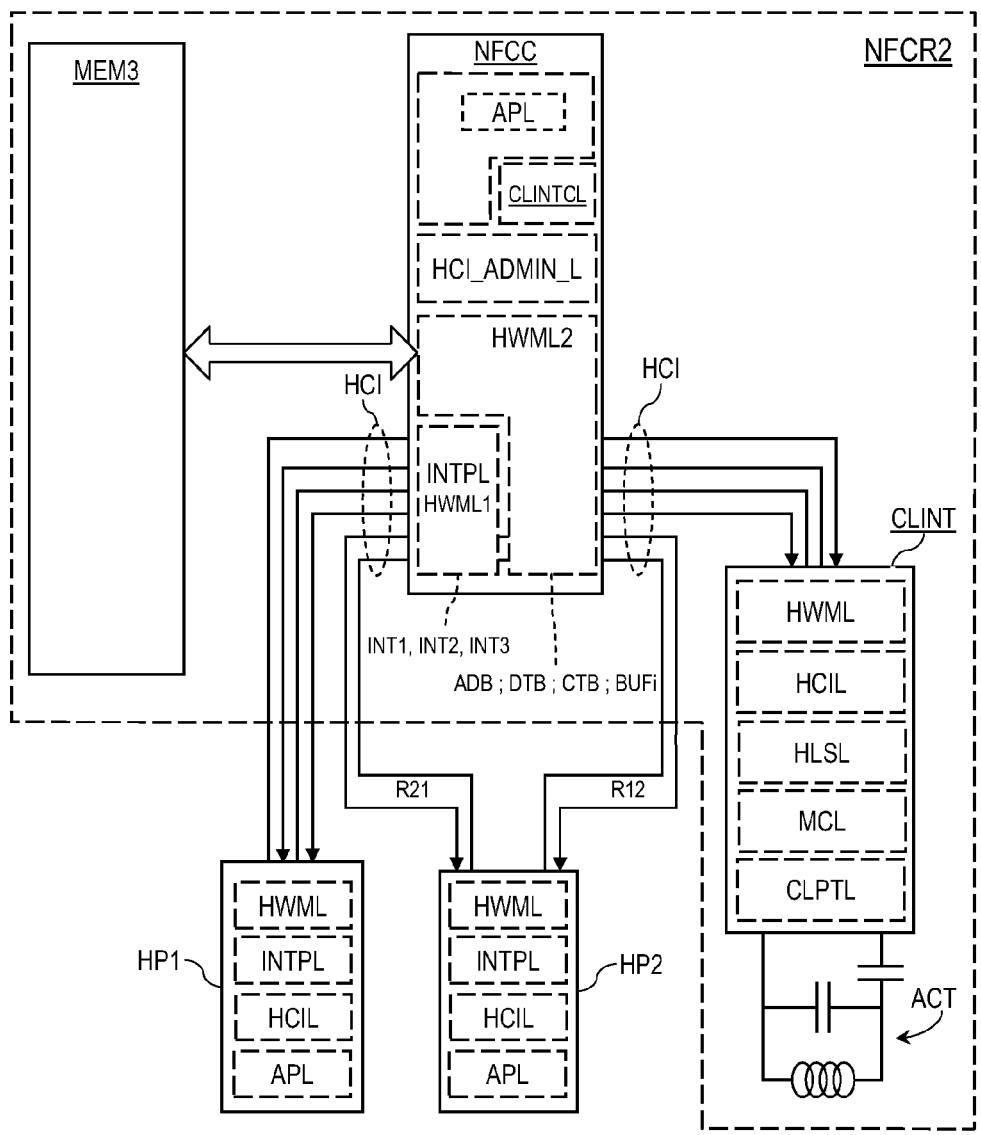
FIG. 7 shows an example of software architecture of the NFC component in FIG. 6 according to a preferred embodiment.

FIG. 7 represents an example of software architecture of the component NFCR2 and of the host processors HP1, HP2. This software architecture comprises, for the NFC component NFCR2 and the host processors HP1, HP2 of the system, several software layers going from the lowest level (data link layer) to the highest level (application layer). The representation of these software layers in FIG. 9 is simplified compared to the real software architecture of an NFC system according to one embodiment, but is sufficient for those skilled in the art wishing to implement the embodiment in the manner proposed here.

Figure 1:
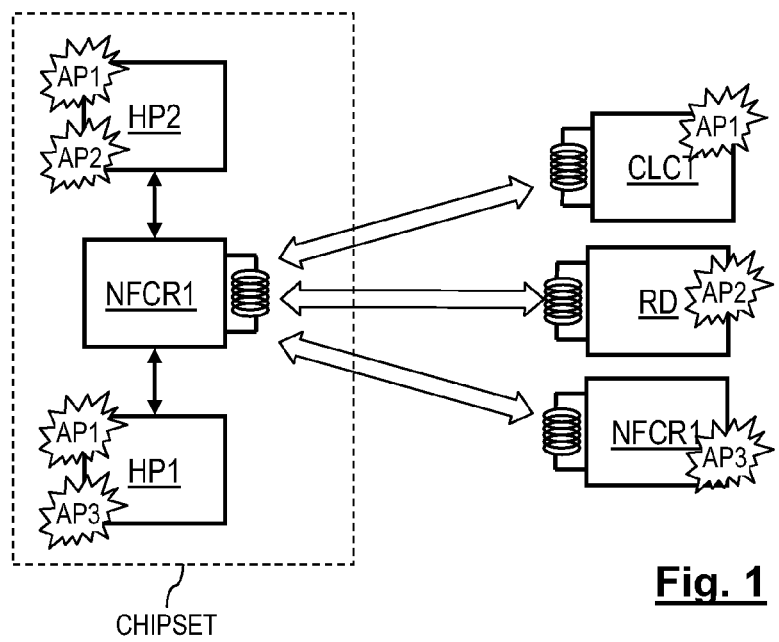
FIG. 1 shows in block form a classic architecture of NFC chipset, and contactless circuits with which the NFC chipset can communicate.
Figure 2:
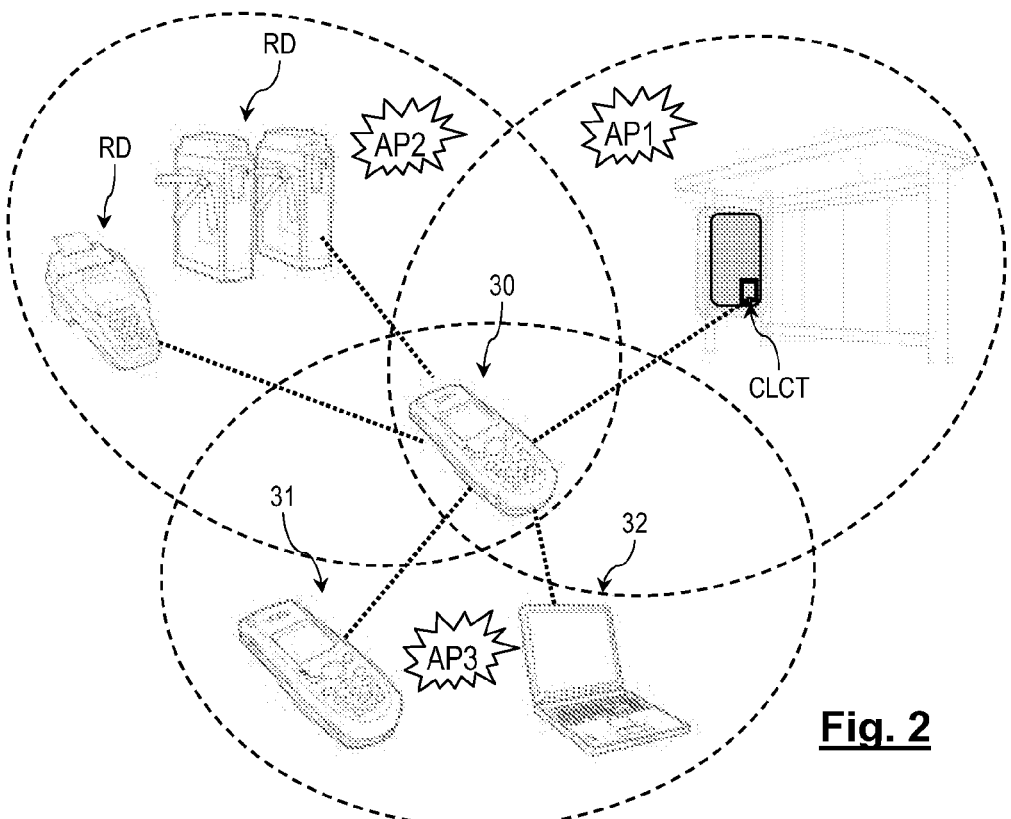
FIG. 2 shows various applications of an NFC chipset integrated into a mobile telephone.
Figure 3:
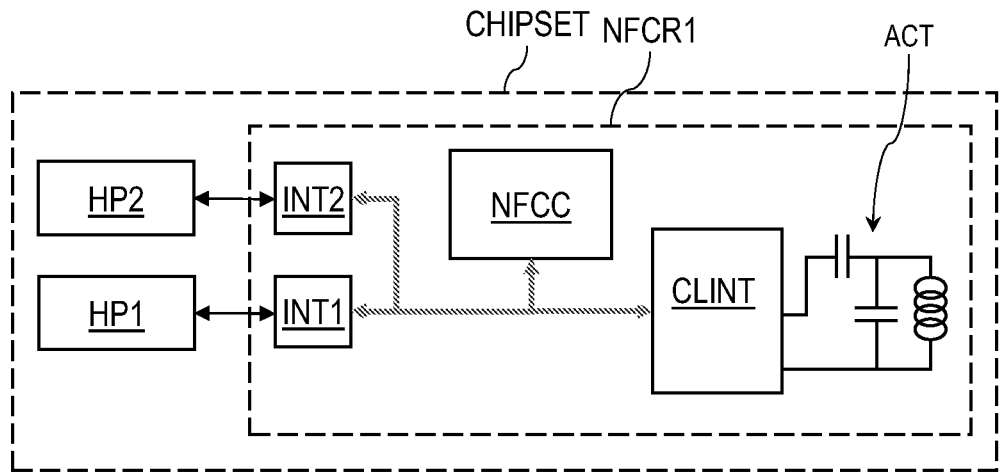
FIG. 3 shows in block form the classic architecture of an NFC component present in the NFC chipset in FIG. 1.

Each host processor HP1, HP2 includes at least four software layers, in an ascending order of level. A lowest level layer Hardware Management Layer (HWML) manages the operation of the hardware elements enabling the host processors HP1, P2 to exchange data with the controller NFCC. This is, for example, the management layer of the UART interface for the processor HP1 and the management layer of the ISO7816 interface for the processor HP2. An Interface Protocol Layer (INTPL) layer manages the protocol of the communication ports INT1, INT2, INT3. This is, for example, the management layer of the UART protocol for the processor HP1 and the management layer of the ISO7816 protocol for the processor HP2. An HCIL layer manages the HCI protocol according to one embodiment, i.e., manages the creation of a communication channel. The HCIL layer rests on the INTPL and HWML layers that are practically transparent to the HCIL layer. A high level Application layer APL manages the RFID applications such as those represented in FIG. 2 (reading a chip card or an electronic tag, emulation of a chip card, dialogue in "device-to-device" mode with an external processor to exchange files, or the like). The APL layer may include several application programs, each being secure or not (according to the internal resources of the processor) and each using a type of protocol and an operating mode of the interface CLINT. Thus, the high level APL layer rests on the HWML, INTPL layers and the HCIL layer, which are practically transparent to the APL layer.

In a substantially similar manner, the controller NFCC includes the following software layers. Two HWML1 and INTPL layers are included and are of the same type as the HWML and INTPL layers present in the host processors HP1, HP2. For the sake of simplicity of the diagram, these layers are represented in the processor NFCC, but in reality are located in the ports INT1 and INT2, which are considered to be part of the controller, as well as the buses ADB, DTB, CTB. Indeed, the processing of the UART and 7816 protocols is performed here in the ports INT1, INT2, which make their input and output buffers BUF1, BUF2 available to the controller via the buses ADB, DTB, CTB. Another low level layer HWML2 enables the controller to write to the buffers BUF1 and to read the buffers BUF2, via the buses ADB, DTB, CTB, by breaking down the data frames or the commands into data blocks of the same size as the buffers. An HCI-ADMIN-L layer or HCI protocol administration layer communicates with the HCIL layers of the host processors HP1, HP2 as routing administrator. A CLINTCL (Contactless Interface Control Layer) layer manages the interface CLINT and indicates thereto the mode into which the interface CLINT must put itself and the protocol to be used to send data in a contactless communication channel. The CLINTCL layer also controls the interface CLINT in contactless data receipt mode and cyclically asks the interface CLINT to perform a scan of the modes ("reader" mode, "emulation" mode and "device" mode) and to search for incoming data in each mode. The interface CLINT thus emits a magnetic field at regular intervals to poll any contactless cards or tags (or other portable objects operating in a contactless manner) that could be present within its polling range. The interface CLINT also puts itself at regular intervals into a listening mode ("emulation" mode) to detect whether a reader in active mode is sending polling messages. An optional APL layer can itself manage applications, just like the host processors HP1, HP2. Indeed, although it has not been described until now, applications can also be managed by the NFC component itself.

Finally, the interface CLINT includes the following software layers. On the controller NFCC side, a HWML low level layer equivalent to the HWML2 layer of the controller NFCC manages the data buffers BUF1, BUF2 via the buses ADB, DTB, CTB. An HCIL layer (as indicated above) makes the interface CLINT compatible with the HCI protocol. On the antenna circuit ACT side, Contactless Protocol Layer (CLPTL) and Mode Control Layer (MCL) layers control or process the electric signals applied to the antenna circuit ACT or received thereby.

It will be understood by those skilled in the art that various alternative embodiments are possible. Thus, an NFC chipset may comprise a single host processor and an NFC component, where execution of applications are controlled.

Furthermore, other authentication procedures than the one described with reference to FIG. 5 may be employed. Other procedures may be implemented to check that the host processor HP2 and the component NFCR2 have secret data linked to each other by a predefined relation.

Moreover, the secret data K2 may be transmitted to the component NFCR2 in other manners than by a contactless link. Thus, the secret data K2 can be transmitted by optically reading an optical code (e.g., a bar code) or by keyboarding the secret data K2 captured appearing on the card from which the SIM card (host processor HP2) is removed. The host processor HP1, which is connected to the image sensor or to the keyboard and to the controller NFCC, then transmits the secret data K2 captured to the controller NFC. In the case of the optical code, the processor HP1 also translates the optical code to obtain the secret data K2. These alternative embodiments are perfectly suited to the current architecture of mobile telephones, which have a keyboard and generally an image sensor.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An authentication method between a secure host processor and a controller of an NFC system, the method comprising:
providing the secure host processor removably attached to a physical medium, the secure host processor storing a first cryptographic data and the physical medium saving a second cryptographic data;
detaching the host processor from the physical medium and connecting the host processor to an NFC controller of an NFC system;
transmitting the second cryptographic data from the physical medium to the NFC controller and storing the second cryptographic data by the NFC controller; and
executing an authentication sequence by the NFC controller and the host processor, the authentication sequence comprising checking that there is a relation between the first cryptographic data stored by the host processor and the second cryptographic data stored by the NFC controller, wherein the authentication sequence is successful if the relation is found between the first cryptographic data and the second cryptographic data.

2. The method of claim 1, wherein the NFC controller authenticates the host processor by receiving from the host processor a derived data derived from the first cryptographic data, and by checking the relation between the first and second cryptographic data using the derived data and the second cryptographic data.

3. The method of claim 1, wherein the host processor authenticates the NFC controller by receiving from the NFC controller a derived data derived from the second cryptographic data, and by checking the relation between the first and second cryptographic data, using the derived data and the first cryptographic data.

4. The method of claim 1, further comprising:
transmitting by the NFC controller a session key to the host processor if the host processor is authenticated by the NFC controller, the session key being used to cipher data exchanged between the host processor and the NFC controller.

5. The method of claim 1, further comprising:
sending an authentication request by the host processor to the NFC controller;
answering the request by the NFC controller by supplying a random number;
ciphering by the host processor the random number received using an encryption function using the first cryptographic data as an enciphering key;
transmitting the result of the enciphering to the NFC controller; and
checking by the NFC controller the result of the enciphering received by means of an encryption function using the second cryptographic data as an enciphering key, the authentication of the host processor being successful if the check was successfully performed.

6. The method of claim 1, wherein the first and second cryptographic data are identical.

7. The method of claim 1, wherein the first cryptographic data is a private enciphering key and the second cryptographic data is a public enciphering key linked to the first cryptographic data by an asymmetric encryption relation.

8. The method of claim 1, wherein the NFC controller is connected to an NFC interface circuit for sending and receiving contactless data, and
wherein the physical medium which the host processor is removably associated with comprises a contactless component storing the second cryptographic data and transmitting the second cryptographic data to the NFC controller by means of the NFC interface circuit.

9. The method of claim 8, wherein the physical medium is a card integrating the contactless component, the host processor is an integrated circuit of a SIM card removable from the card, and the NFC system is a mobile telephone comprising another host processor connected to the controller.

10. The method of claim 1, wherein the second cryptographic data is transmitted to the NFC controller by at least one of optically reading an optical code, which is translated and transmitted to the NFC controller, and keyboarding the value of the cryptographic data, which is transmitted to the NFC controller.

11. An NFC system comprising:
an interface circuit for sending/receiving contactless data of NFC type;
an NFC controller connected to the interface circuit and comprising a connector; and
a secure host processor removably attached to a physical medium, the secure host processor storing a first cryptographic data and the physical medium saving a second cryptographic data, the NFC controller being configured to receive from the physical medium and store the second cryptographic data, the host processor being configured to be detached from the physical medium and connected to the NFC controller by the connector, the NFC controller and the host processor being configured to execute together an authentication sequence comprising checking that there is a relation between the first cryptographic data stored by the host processor and the second cryptographic data stored by the NFC controller, wherein the authentication sequence is successful if the relation is found between the first cryptographic data and the second cryptographic data.

12. The system of claim 11, wherein the NFC controller is configured to authenticate the host processor by receiving from the host processor a derived data derived from the first cryptographic data, and by checking the relation between the first and second cryptographic data, using the derived data and the second cryptographic data.

13. The system of claim 11, wherein the host processor is configured to authenticate the NFC controller by receiving from the NFC controller a derived data derived from the second cryptographic data, and by checking the relation between the first and second cryptographic data using the derived data and the first cryptographic data.

14. The system of claim 11, wherein the NFC controller is configured to transmit a session key to the host processor if the authentication of the host processor by the NFC controller was successful, the session key being used to cipher the data exchanged between the host processor and the NFC controller.

15. The system of claim 11, wherein:
the host processor is configured to send an authentication request to the NFC controller;
the NFC controller is configured to answer the request by supplying a random number;
the host processor is configured to cipher the random number received using an encryption function using the first cryptographic data as an enciphering key, and to transmit the result of the enciphering to the NFC controller; and
the NFC controller is configured to check the result of the enciphering received using an encryption function using the second cryptographic data it stores as an enciphering key, the authentication of the host processor being successful if the check was successfully performed.

16. The system of claim 11, wherein the first and second cryptographic data are identical.

17. The system of claim 11, wherein the first cryptographic data is a private key and the second cryptographic data is a public key linked to the first cryptographic data by an asymmetric encryption relation.

18. The system claim 11, wherein the physical medium which the host processor is removably associated with comprises a contactless component storing the second cryptographic data for contactlessly transmitting to the NFC controller.

19. The system of claim 18, wherein the physical medium is a card integrating a contactless component storing the second cryptographic data for contactlessly transmitting to the NFC controller, the host processor is an integrated circuit of a' SIM card removable from the card and the NFC system is a mobile telephone comprising another host processor connected to the NFC controller.

20. The system of claim 11, wherein the second cryptographic data is transmitted to the NFC controller by at least one of:
(i) optically reading an optical code, which is translated and transmitted to the NFC controller, and
(ii) keyboarding the value of the second cryptographic data, which is transmitted to the NFC controller.

21. A smart card comprising:
an integrated circuit card removable from the smart card and integrating a secure processor saving a first cryptographic data; and
a physical medium saving a second cryptographic data to be contactlessly transmitted, the second cryptographic data being linked to the first cryptographic data by a checkable relation, wherein the secure processor is configured to authenticate an NFC controller storing the second cryptographic data by receiving from the NFC controller a derived data derived from the second cryptographic data and by checking, the relation between the first and second cryptographic data, using the derived data and the first cryptographic data.

22. The smart card of claim 21, wherein the secure processor is configured to receive a session key if the secure processor has been authenticated by an NFC controller, the session key being used to cipher data exchanged between a host processor and the NFC controller.

23. The smart card of claim 21, wherein the secure processor is configured to:
send an authentication request;
receive a random number as a response to the authentication request;
cipher the random number received using an encryption function using the first cryptographic data as an enciphering key; and
transmit the result of the enciphering.

24. The smart card of claim 21, wherein the first cryptographic data is a private key and the second cryptographic data is a public key linked to the first cryptographic data by an asymmetric encryption relation.

25. The smart card of claim 21, wherein the physical medium saving the second cryptographic data comprises a memory coupled to a contactless interface circuit sending and receiving contactless data, and the smart card is configured to read in the memory and transmit the second cryptographic data.

26. The smart card of claim 21, wherein the second cryptographic data is memorized using an optical code intended to be optically read.

* * * * *